Aug. 17, 1965   J. K. LYON ETAL   3,201,081
DISPENSING VALVE HAVING CUP-LIKE DEFORMABLE SEALING ELEMENT
Filed Aug. 14, 1961
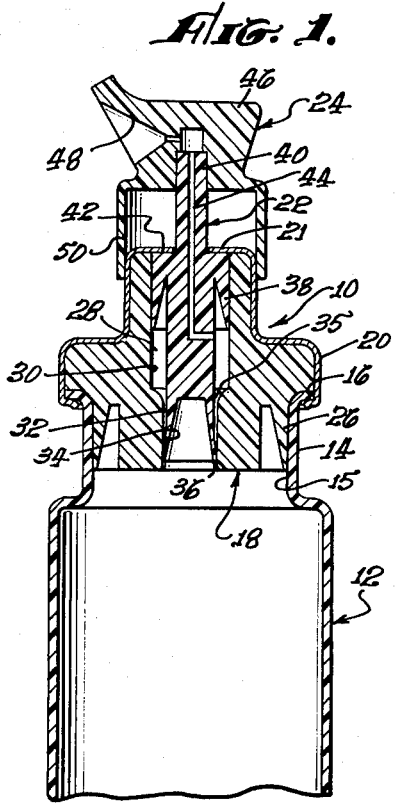
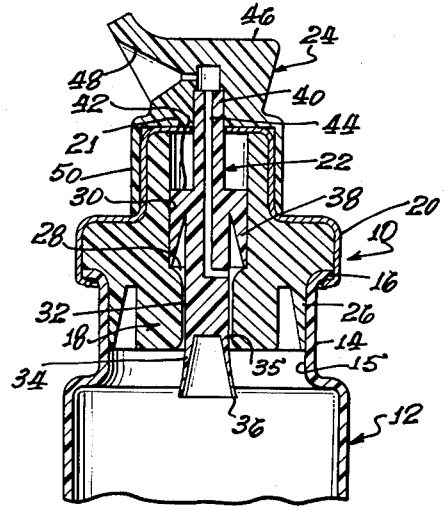
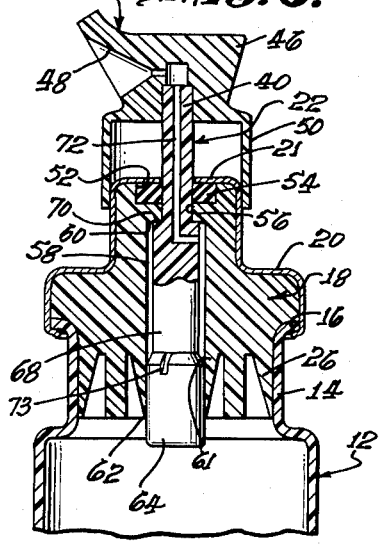
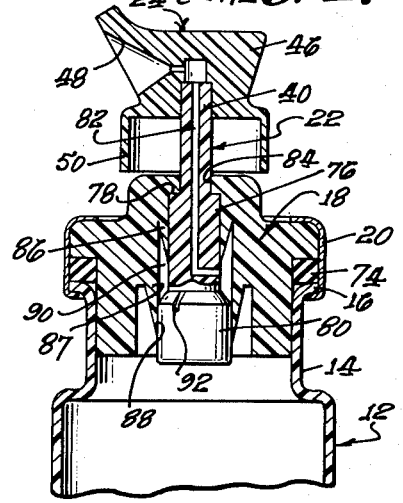
INVENTORS.
JOHN K. LYON,
GENNADY POTAPENKO,
BY THEIR ATTORNEYS.
HARRIS, KIECH, RUSSELL & KERN.

United States Patent Office 3,201,081
Patented Aug. 17, 1965

3,201,081
DISPENSING VALVE HAVING CUP-LIKE
DEFORMABLE SEALING ELEMENT
John K. Lyon, 1176 Afton, and Gennady Potapenko, 1718 Oakdale St., both of Pasadena, Calif.
Filed Aug. 14, 1961, Ser. No. 131,392
12 Claims. (Cl. 251—172)

The present invention relates generally to the valve art and more particularly to a novel dispensing value for use with pressurized containers to produce a continuous flow.

Briefly stated, the instant invention includes a value housing member which contains a passageway therethrough, and a valve stem member mounted in the passageway for axial movement relative thereto between an open position and a closed position. One inventive concept resides in the use of one or more vertically spaced annular flanges or cup-like elements on one member, e.g. the valve stem, and one or more vertically spaced co-operating wall surfaces on the other member, e.g. the valve housing. The cup-like elements include a base and a lip portion with the latter extending beyond the base and being normally of a greater size than the inside diameter of the wall surface which it engages. Thus, when the lip portion remains in sliding engagement with its respective wall surface at all times, it functions as a sealing device. On the other hand, when one of the cup-like members moves into and out of engagement with its respective wall surfaces, as when the valve stem member is moved between the closed position and the open position, it closes off the passageway when it is in engagement with said surface and permits the flow of fluid therebetween when it is spaced axially relative to its wall surface. In the preferred form, the valve housing and the valve stem are each of unitary construction and are molded from plastic material with the member containing the cup-like element being of softer material than the other member, whereby the annular flanges or cup-like element is deformed when in operative position.

It is well known that there are many different types and styles of dispensing valves, but for the most part they are relatively expensive due to the fact that they contain numerous parts or require extensive machining.

It is an object of the present invention, therefore, to provide a novel dispensing valve which is extremely simple in construction and relatively inexpensive to manufacture. More particularly, it is an object to provide such a valve which contains a minimum number of parts, each of which is of simple design. Specifically, it is an object to provide a novel dispensing valve which includes only two major components, a valve housing member and a valve stem member, both of which are of unitary construction and molded from plastic material.

Another object is to provide a novel dispensing valve for pressurized containers which is relatively simple in design and which is extremely durable and reliable. More particularly, it is an object to provide such a valve which can provide controlled continuous flow from a pressurized container when in the open position, and which can effectively seal off the flow of fluid from the container when it is in the closed position.

Yet another object is to provide a novel dispensing valve in which the pressurized fluid in the container increases or enhances the sealing function of the valve in the closed position. More particularly, it is an object to provide such a valve which includes one or more annular flanges or cup-like sealing elements which are exposed to the pressurized fluid in such a manner that the latter tends to increase the force on the inner surfaces of said elements and thereby improve or enhance their sealing action.

An additional object is to provide a novel dispensing valve whereby the container can be charged with pressurized fluid with the valve in either the open or the closed position.

Further objects and advantages of the present invention will be apparent from the following detailed description, reference being had to the accompanying drawing wherein preferred embodiments of the present invention are shown.

In the drawing:

FIG. 1 is a vertical sectional view of a novel dispensing valve constructed in accordance with the teachings of the present invention, shown with the valve stem member in the closed position;

FIG. 2 is a view similar to FIG. 1 showing the valve stem member in the open position;

FIG. 3 is a vertical sectional view of a modified valve construction shown with the valve stem member in the closed position; and FIG. 4 is a vertical sectional view of yet another modified valve construction, also showing the valve stem member in the closed position.

Referring to the drawing more particularly by reference numerals, specifically FIGS. 1 and 2, 10 indicates generally a valve construction embodying the teachings of the present invention, shown used with a container 12 which may be charged with a pressurized material such as a deodorant or the like.

The container 12 may be made of metal or plastic material and includes a neck portion 14 with an inner wall surface 15 and a flange-like lip 16.

The valve 10 includes a valve housing member 18 which is fastened to the container by means of a tubular connector 20 which has an upper flange portion 21, a valve stem member 22 slidably mounted within the housing in a passageway and movable between an open and a closed position, and a cap or actuator 24 mounted on top of the valve stem member. Both the valve stem member and the valve housing member are preferably of unitary construction and molded from plastic material. In the embodiment shown in FIGS. 1 and 2 the material used for forming the valve stem member is softer or more resilient than the material used for forming the valve housing member for a reason to be discussed more fully hereinafter.

The valve housing member 18 includes an outer annular depending flange or skirt 26, the outer surface of which in the unconfined position extends downwardly and outwardly, whereby when the valve housing member is positioned in the neck portion 14, it forms an effective seal with the wall surface 15 of the neck portion 14. It will also be appreciated that pressurized fluid in the container 12 will aid or increase the sealing action of the annular flange 26 by forcing it against the inner wall surface 15.

The housing member 18 also includes a vertically extending valve stem passageway which contains an upper transfer chamber 28 with a smooth inner wall surface 30, and a lower passageway 32 with a smooth inner wall surface 34. The passageway 32 is smaller in diameter than the transfer chamber and provides for communication between said chamber and the interior of the container 12, as when the valve stem member 22 is in the open position.

The valve stem member 22 includes a lower cup-like sealing element with a depending flange having a base 35 and a lip portion 36. The base 35 of the sealing element is slightly smaller than the inside diameter of the lower passageway 32 and the lip portion is larger than both the base and said passageway when the sealing member is in an unconfined position, whereby when the valve stem member 22 is in the closed position (FIG. 1) the flange portion 36 is in sealing engagement with the inner wall surface 34 of the lower passageway 32. The valve stem member also includes an upper cup-like sealing element with a similarly constructed outwardly extending flange 38 which remains in sliding sealing engagement with the inner wall surface 30 of the transfer chamber 28.

A stem portion 40 of reduced diameter projects upwardly through an aperture contained in the flange portion 21 and provides a shoulder 42 which limits the upward movement of the valve stem member 22 by engagement with said flange portion 21. A discharge passageway 44 is contained in the valve stem member and extends from the upper end thereof to the transfer chamber 28.

A cap or actuator 46 is mounted on the upper end of the stem portion 40 and contains a discharge port 48 in communication with the discharge passageway 44, and a depending flange portion 50 which is in sliding engagement with the upper portion of the tubular connector 20.

Referring to FIG. 1, it will be noted that when the valve stem member 22 is in the closed position, the lip portion 36 of the lower cup-like element is in sealing engagement with the inner wall surface 34 as previously described. Also, as mentioned with respect to the depending flange or skirt 26, the pressurized fluid in the container 12 acts against the inner surfaces of the depending flange so as to force the lip portion 36 against the wall surface 34 and thereby increase the sealing action thereof.

When the valve stem member 22 is moved to the open position (FIG. 2) as by pressing downwardly on the cap 46, the lip portion 36 of the lower sealing member is moved out of the lower passageway 32 and spaced axially of the lower edge of the wall surface 34 whereby fluid may pass upwardly between the base of the sealing member and the wall surface 34 into the transfer chamber 28, through the discharge passageway 44, and thence out through the discharge port 48. It will be noted, however, that fluid is prevented from escaping from the transfer chamber 28 around the valve stem member 22 by the flange element 38 which is in sealing engagement with the wall surface 30. Here again, the pressure exerted by the fluid in the transfer chamber 28 is directed against the inner surfaces of the flange element 38 and thereby increases the sealing action thereof.

When the cap 46 is released, the fluid pressure in the container, acting against the lower surfaces of the valve stem member 22, moves the latter upwardly until the shoulder 42 engages the flange portion 21.

The pressurizing or charging of the container can be accomplished by connecting the upper part of the discharge passageway 44 to a source of pressurized gas. This can be done when the valve is either in its closed or opened position because the lip portion 36 of the lower sealing element will flex inwardly away from the wall surface 34 when fluid flows downwardly at an increased pressure.

Turning to a consideration of the modified valve construction shown in FIG. 3, it also includes a valve housing member 18 which is fastened to a container 12 by a tubular connector 20 which includes an upper flange portion 21. In like manner, it includes a valve stem member 22 with a stem portion 40 which has a cap 46 mounted on the upper end thereof and provided with a discharge port 48. The valve housing member is also provided with a depending flange or skirt 26 which is in sealing engagement with the inner wall surface of the neck portion 14 of the container as previously described.

However, the upper portion of the valve housing member is provided with an annular cavity or recess 52 which contains a sealing washer 54 which receives the stem portion 40 in sliding sealing engagement. A narrow passageway 56 is provided below the sealing washer 54 which connects with a relatively long vertically extending chamber or passageway 58 of increased diameter which provides a shoulder 60 therebetween.

Adjacent the bottom of the chamber 58 is a depending annular flange or cup-like member which has a base 61 and a lip portion 62. For a reason which will be discussed more fully hereinafter, the inside diameter of the lip portion in the free position is smaller than the inside diameter at the base, i.e. the inner wall surface of the flange or cup-like member extends downwardly and inwardly.

The valve stem member 22 includes a lower cylindrical sealing portion 64 which has an outer wall surface and which is of slightly smaller diameter than the chamber 58. Above the sealing portion 64 is an intermediate or body portion 68 of reduced diameter which has a shoulder 70 adjacent the upper end thereof for engagement with the shoulder 60 of the valve housing member. The intermediate or body portion 68 and the stem portion 40 contain a discharge passageway 72 which provides communication between the chamber 58 and the discharge port 48 in the cap. A groove 73 is provided in the conical surface between the lower sealing portion 64 and the body portion 68 to facilitate the commencement of the discharge, as will be discussed more fully hereinafter.

When the valve stem member 22 is in the closed position (FIG. 3), the lip portion 62 of the annular flange or cup-like member is in sealing engagement with the outer wall surface of the sealing portion 64 of the valve stem member so as to prevent fluid from entering into the chamber 58 from the interior of the container 12. Here again, it will be noted that the pressure of the fluid within the container 12, acting on the outer surfaces of the flange or cup-like sealing member further increases the sealing action thereof.

When the valve stem member 22 is forced downwardly to move it to the open position, the sealing portion 64 of the valve stem member is moved below the lip portion 62 whereby fluid is free to pass first through the groove 73 and then between the inner surface of the cup-like member and the intermediate or body portion of the valve stem member, and in to the chamebr 58. From the chamber 58 the fluid flows through the passageway 72 and out the discharge port 48 in the cap 46. As mentioned hereinabove, the washer 54 prevents the escape of fluid from the chamber 58 and around the stem portion 40.

Turning to a consideration of the valve shown in FIG. 4, also includes a valve housing member 18 which is fastened to a container 12 by means of a tubular connector 20, and contains a valve stem member 22 which has a cap 46 mounted on the stem portion 40 thereof, the cap being provided with an outlet port 48 as previously described. However, it will be noted that a washer 74 is provided between the valve housing member 18 and the tubular connector 20 for sealing the valve housing member to the container 12.

The valve stem member 22 includes an upper stem portion 40, as previously mentioned, an intermediate or body portion 76 of increased diameter to provide a shoulder 78 therebetween, and a lower or sealing portion 80 of further increased diameter which provides an outer wall surface. A discharge passageway 82 extends from the periphery of the intermediate portion 76 to the discharge port 48 in the cap. The valve housing member 18 contains a vertically extending passageway which includes an aperture 84 at the upper end thereof for slidably receiving the stem portion 40, an upper annular flange or cup-like sealing element 86 which is similar in construction and operation to the sealing element 38 shown and described in FIGS. 1 and 2 except that in the construction shown in FIG. 4 it forms part of the valve housing member and is in sealing engagement with the valve stem member, whereas in the embodiment previously described the construction was reversed, i.e. the flange-like element was contained on the valve stem member and in sliding sealing engagement with a wall surface contained in the valve housing member. The valve housing member 18 shown in FIG. 4 also contains a lower annular flange or cup-like sealing member which is concentric with the passageway and which includes a base 87 and a lip portion 88. As previously described with respect to the construction shown in FIG. 3, the diameter at the lip portion is less than the diameter at the base so that the flange extends downwardly and inwardly and the lip portion 53 is adapted to engage the outer wall surface of the enlarged portion 80 in sealing engagement therewith when the valve stem member 22 is in the closed position as shown in FIG. 4. A transfer chamber 90 is formed in the valve housing member 18 between the flange 86 and the lower cup-like sealing element.

A groove 92 is provided in the conical surface of the stem member between the lower portion 80 and the body portion 76 to facilitate the commencement of discharge as previously described relative to the construction of FIG. 3.

As mentioned hereinabove, when the valve stem member 22 is in the closed position (FIG. 4), the lip portion 88 of the lower cup-like element is in sealing engagement with the enlarged portion 80. Also, as previously mentioned, the pressurized fluid in the container 12 acts against the outer surfaces of the depending flange-like member so as to further increase the sealing action thereof.

When the cap 46 and valve stem member 22 are depressed so as to move the latter to the open position, the upper edge of the lower portion 80 passes axially downwardly below the lip portion 88 so as to permit fluid from the container 12 to pass into the transfer chamber 90, through the discharge passageway 82, and out through the discharge port 48. However, it will be noted that fluid is prevented from escaping around the valve stem portion 40 because the depending flange 86 remains in sliding sealing engagement with the intermediate or body portion 76.

Returning to a general consideration of all of the various modifications disclosed herein, it will be noted from a comparison of the construction shown in FIGS. 1 and 3 that the valve in FIG. 1 utilizes two annular flanges or cup-like members for sealing purposes, i.e. in the valve proper, between the valve housing member and the neck of the container, and between the valve stem member and the valve housing member. On the other hand, the valve shown in FIG. 3 utilizes two similar annular flanges or cup-like elements, one in the valve proper, and the other between the valve housing member and the neck of the container. Stating it differently, the construction in FIG. 3 utilizes the annular flange or cup-like construction for everything except preventing the escape of pressurized fluid from the transfer chamber around the valve stem member.

Considering the modified valve construction shown in FIG. 4, it also utilizes two annular flange or cup-like sealing elements, in addition to a sealing washer. It will be noted that the valve in FIG. 4 differs from the one shown in FIG. 3 in that the former utilizes the washer for providing a seal between the valve housing member and the container instead of between the valve housing member and the valve stem portion. It will also be noted that although the construction shown in FIG. 4 employs two vertically spaced annular flanges or cup-like sealing elements between the valve stem member and the valve housing member—similar to the construction shown in FIG. 1; in FIG. 4 the flexible annular flanges or cup-like sealing elements are part of the valve housing member whereas in FIG. 1 they are part of the valve stem member. Consequently, in the construction shown in FIG. 1, the valve stem member 22 would be molded from a plastic material which is somewhat softer and more resilient than the material used in molding the valve housing member 18, whereas in the valve construction shown in FIG. 4, the reverse would be true. In the valve construction shown in FIG. 3 the material of the valve housing member 18 will also be softer or more resilient than the matrial used in molding the valve stem member 22.

However, it is again emphasized that the same inventive concept is involved in all of the constructions disclosed herein i.e. the use of one or more relatively flexible annular flanges or cup-like sealing elements in either fixed or sliding sealing engagement with a relatively hard surface where the only function is sealing, and in selected sealing engagement with a relatively hard wall surface where the cup-like element functions as the valve proper. As also mentioned hereinabove, the inventive concept is the same whether the cup-like elements are formed on the valve housing member or the valve stem member.

Thus it is apparent that there has been provided a novel dispensing valve construction with several modifications, which fulfills all of the objects and advantages sought therefor.

It is to be understood that the foregoing description and the accompanying drawing have been given only by way of illustration and example and that changes and alterations in the present disclosure which will be readily apparent to one skilled in the art are contemplated as within the scope of the present invention.

We claim:

1. In a dispensing valve for a pressurized container: a housing member adapted to be received in the neck portion of a container and including an inner end and an outer end; a passageway through said housing between the inner and outer ends thereof; a stem member mounted in said passageway for axial movement relative thereto between an open position and a closed position; a cylindrical wall surface of a predetermined diameter adjacent the inner end of the passageway; a cup-like sealing element with a base and a lip portion contained in said stem member at the inner end thereof, the diameter at the base being less than the diameter at the lip, the diameter of the cylindrical wall surface being greater than the diameter of the base of the sealing element but less than the diameter at the lip thereof, whereby when the stem member is in the closed position the cup-like sealing element is positioned with the lip portion thereof in sealing engagement with said wall surface, and when the stem member is in the open position the cup-like sealing element is positioned axially inwardly of said wall surface so that fluid can escape between said surface and the base portion; and passage means for establishing communication from said wall surface to the exterior of the housing when said stem member is in the open position.

2. In a dispensing valve for a pressurized container: a housing member adapted to be received in the neck portion of a container and including an inner end and an outer end; a passageway through said housing between the inner and outer ends thereof; a stem member mounted in said passageway for axial movement relative thereto between an open position and a closed position, an upper portion of said stem member being of lesser cross-sectional area than an upper portion of said passageway to define a transfer chamber therebetween; passage means at least partially in said stem member for placing said transfer chamber in communication with the exterior of the valve; one of said members providing upper and lower cylindrical wall surfaces of predetermined diameters at the passageway, the other of said members providing upper and lower cup-like sealing elements each with a lip portion adjacent one of said cylindrical wall surfaces, respectively, said cylindrical wall surfaces and said cup-like sealing elements each being of a size and being positioned so that the upper lip portion and the upper wall surface remain in sliding sealing engagement when the stem member is in the closed position and in the open position, and the lower lip portion is in sealing engagement with the lower wall surface when the stem member is in the closed position and is spaced axially therefrom when said member is in the open position, said stem member and said passageway being so formed that communication is established between said transfer chamber and said inner end of said housing member when said stem is in said open position.

3. In a dispensing valve for a pressurized container: a housing member adapted to be received in the neck portion of a container and including an inner end and an outer end; a passageway extending through said housing and providing an upper cylindrical wall surface having a predetermined inside diameter, and a lower cylindrical wall surface having a predetermined inside diameter; a stem member mounted in said passageway for axial movement between an open position and a closed position; an upper cup-like sealing element contained on said stem member and including a lip portion in sliding sealing engagement with the upper wall surface; a lower cup-like sealing element contained on the inner end of the stem member and including a base and a lip portion of predetermined outside diameters, the diameter at the lip portion being greater than the diameter at the base, the diameter of the lower wall surface being greater than the diameter at said base but less than the diameter at the lip portion, whereby when the stem member is in the closed position the lip portion of the lower cup-like element is in sealing engagement with said lower wall surface and when said member is in the open position the lip portion of the sealing element is disposed axially inwardly of said lower wall surface to provide a space between it and said lower cup-like sealing element; and passage means for establishing communication from said space to the exterior of the housing when said stem is in the open position.

4. In a dispensing valve for a pressurized container: a housing member adapted to be received in the neck portion of a container and including an inner end and an outer end; a passageway extending through said housing and providing an upper cylindrical wall surface having a predetermined inside diameter, and a lower cylindrical wall surface having a predetermined inside diameter, the diameter of the lower wall surface being less than the diameter of the upper wall surface; a stem member containing a body portion mounted in said passageway for axial movement between an open position and a closed position, the diameter of the body portion being less than the diameter of the upper wall surface to provide a transfer chamber therebetween; an upper cup-like sealing element contained on said body portion of the stem member and including a lip portion in sliding sealing engagement with the upper wall surface; a lower cup-like sealing element projecting from the inner end of the stem member and including a base and a lip portion of predetermined outside diameters, the diameter at the lip being greater than the diameter at the base, the diameter of the lower wall surface being greater than the diameter at said base but less than the diameter at the lip portion, whereby when the stem member is in the closed position the lip portion of the lower cup-like element is in sealing engagement with said lower wall surface and when said member is in the open position the lip of the lower sealing element is disposed axially inwardly of said lower wall surface to provide communication between the interior of the container and said transfer chamber; and discharge passage means extending through the stem member from between the upper and lower sealing members to adjacent the top of said stem member.

5. In a dispensing valve for a pressurized container: a housing member adapted to be received in the neck portion of a container and including an inner end and an outer end; a passageway extending through said housing and providing an upper cylindrical wall surface having a predetermined inside diameter, and a lower cylindrical wall surface having a predetermined inside diameter; a stem member mounted in said passageway for axial movement between an open position and a closed position; an upper sealing element contained on said stem member and including an outer peripheral portion in sliding sealing engagement with the upper wall surface; and a lower cup-like sealing element contained on the inner end of the stem member and including a base portion and an outer peripheral portion, the diameter of the outer peripheral portion being greater than the diameter at the base portion, the diameter of the lower wall surface being greater than the diameter at the base but less than the diameter of the peripheral portion, whereby when the stem member is in the closed position the outer peripheral portion of the lower sealing element is in sealing engagement with the lower wall surface and when said member is in the open position said peripheral portion is disposed axially inwardly of the lower wall surface to provide a space between it and the lower sealing element.

6. In a dispensing valve for a pressurized container: a housing member adapted to be received in the neck portion of a container and including an inner end and an outer end; a passageway extending through said housing and providing an upper cylindrical wall surface having a predetermined inside diameter, and a lower cylindrical wall surface having a predetermined inside diameter, the diameter of the lower wall surface being less than the diameter of the upper wall surface; a stem member containing a body portion mounted in said passageway for axial movement between an open position and a closed position, the diameter of the body portion being less than the diameter of the upper wall surface to provide a transfer chamber therebetween; an upper sealing element contained on said body portion of the stem member and including an outer peripheral portion in sliding sealing engagement with the upper wall surface; a lower sealing element projecting from adjacent the inner end of the stem member and including an outer peripheral portion and an inner base portion, the diameter at the peripheral portion being greater than the diameter at the base portion, the diameter of the lower wall surface being greater than the diameter at said base but less than the diameter at the peripheral portion, whereby when the stem member is in the closed position the peripheral portion of the lower sealing element is in sealing engagement with said lower wall surface and when said member is in the open position said peripheral portion is disposed axially inwardly of said lower wall surface to provide communication between the interior of the container and said transfer chamber; and discharge passage means extending through the stem member from between the upper and lower sealing members to adjacent the top of said stem member.

7. In a dispensing valve for a pressurized container: a housing member adapted to be received in the neck portion of a container and including an inner end and an outer end; a passageway through said housing between the inner and outer ends thereof; a stem member mounted in said passageway for movement relative thereto between an open and a closed position, an upper portion of said stem member being of lesser cross sectional area than an upper portion of said passageway to define a transfer chamber therebetween; and passage means at least partially in said stem for placing said transfer chamber in communication with the exterior of the valve, one of said members providing a cup-like sealing element with a peripheral lip at a lower portion of said passageway at least in the closed position, the other of said members providing a co-operating wall surface adjacent said cup-like sealing element, the lower portion of said passageway being smooth, said co-operating wall surface and said lip portion each being of a size and being positioned so that they are in sealing engagement when the stem member is in the closed position, and are in axial spaced-apart relationship when the stem member is in the open position, said stem member and said passageway being so formed that communication is established between said transfer chamber and said inner end of said housing member when said stem member is in said open position.

8. A dispensing valve as defined in claim 7 wherein said one of said members is said housing member and said cup-like sealing element has a base and a lip portion at the inner end of said passageway, said cup-like sealing element having a generally circular cross section, the inside diameter at the base being greater than the inside diameter at the lip, and wherein said other of said members is said stem member, said co-operating wall surface being generally cylindrical, the diameter of said co-operating wall surface being smaller than the diameter at the base of the sealing element but greater than the diameter at the lip portion thereof.

9. A dispensing valve as defined in claim 7 wherein said cup-like sealing element depends from the inner end of the housing in axial alignment with said passageway and has a base and a lip portion, said cup-like sealing element being generally circular in cross section, the inside diameter at the base being greater than the inside diameter at the lip portion, said stem member and said passageway being generally circular in cross section, said stem member including a body portion of smaller diameter than the diameter of the passageway so as to provide said transfer chamber therebetween, said stem member having an enlarged portion of generally circular cross section at the inner end thereof providing said cooperating wall surface, the diameter of said enlarged portion being greater than the diameter at the lip portion but smaller than the diameter at the base.

10. A dispensing valve as defined in claim 7 wherein said one of said members is said housing member and said other of said members is said stem member.

11. A dispensing valve as defined in claim 7 wherein said one of said members is said housing member and said other of said members is said stem member, said passageway providing an upper internal annular sealing element and said stem member providing an upper wall surface for engaging said upper annular sealing element in sealing relation in the open position and in the closed position.

12. A dispensing valve as defined in claim 7 wherein said passageway provides an upper internal annular flange element of circular cross section having a base and a lip portion, the inside diameter at the base being greater than the inside diameter at the lip portion, and wherein said cup-like sealing element depends from the inner end of said housing in axial alignment with said passageway and has a base and a lip portion, the inside diameter at the base of said cup-like sealing element being greater than the inside diameter at the lip portion of said cup-like sealing element, said stem member including a body portion providing an upper wall surface and an enlarged portion at the inner end of the body portion providing said co-operating wall surface, said body portion having a circular cross section of smaller diameter than the base of the upper flange element but greater than the diameter of the lip portion of the upper flange element so as to be in sliding sealing engagement therewith, the enlarged portion having a generally circular cross section of smaller diameter than the diameter of the base of the cup-like sealing element but greater than the diameter of the lip portion of the cup-like sealing element.

References Cited by the Examiner

UNITED STATES PATENTS

| | | | |
|---|---|---|---|
| 1,043,656 | 11/12 | Ziringer | 222—510 |
| 1,153,823 | 9/15 | Pierce | 251—353 X |
| 2,095,622 | 10/37 | Wilson | 251—353 X |
| 2,389,297 | 11/43 | Crevatin | 251—354 |
| 2,557,952 | 6/51 | Dumont | 222—387 |
| 2,631,814 | 3/53 | Abplanalp | 251—353 |
| 2,859,932 | 11/58 | Mackal | 251—349 |
| 2,889,086 | 6/59 | Collins | 251—354 |
| 2,895,650 | 7/59 | Mahon | 222—387 |
| 2,961,169 | 11/60 | Nyden | 251—353 X |
| 2,991,044 | 7/61 | Briechle | 251—353 |

FOREIGN PATENTS 839,775  6/60  Great Britain.

ISADOR WEIL, *Primary Examiner.*

CLARENCE R. GORDON, *Examiner.*